Patented Dec. 15, 1931

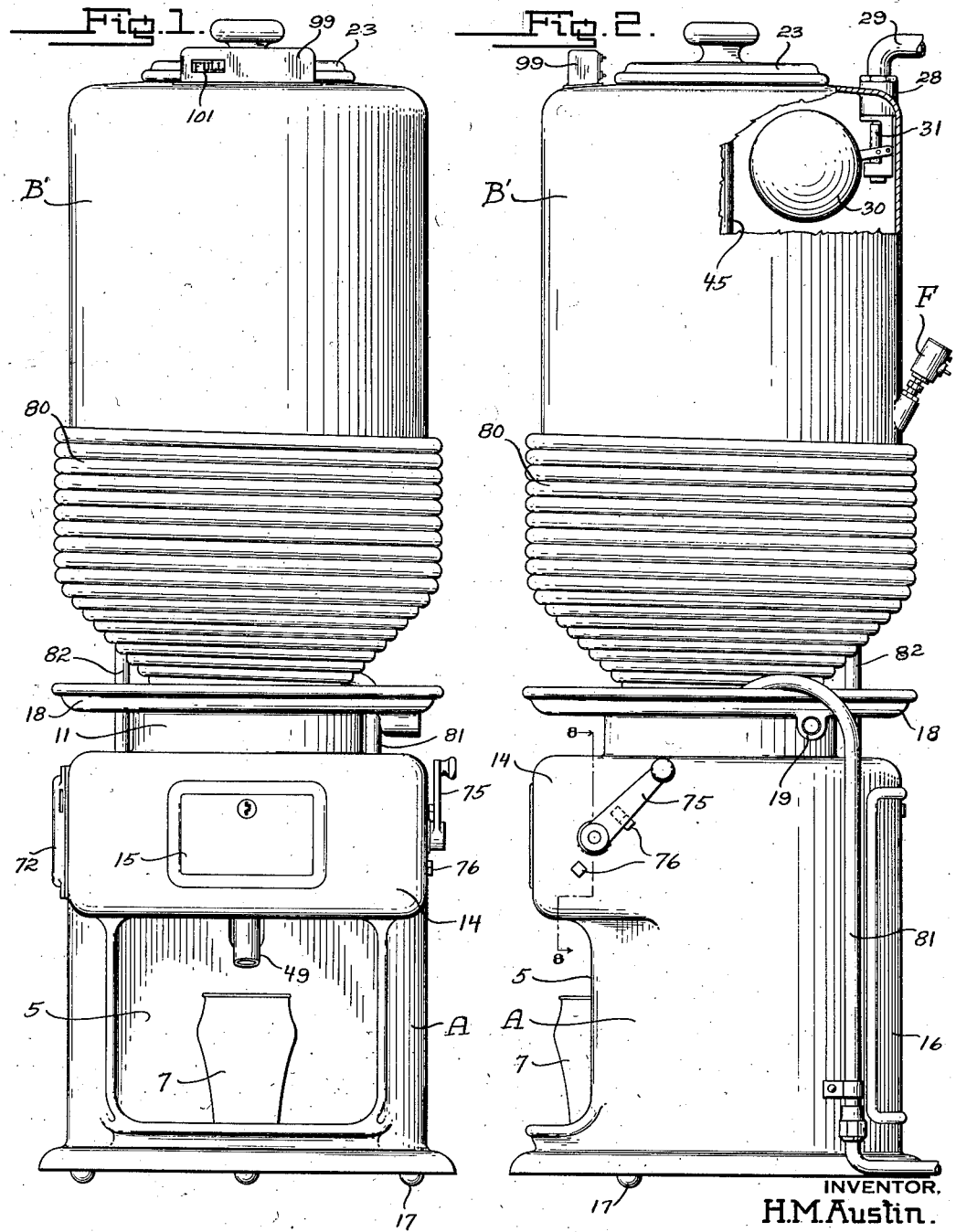

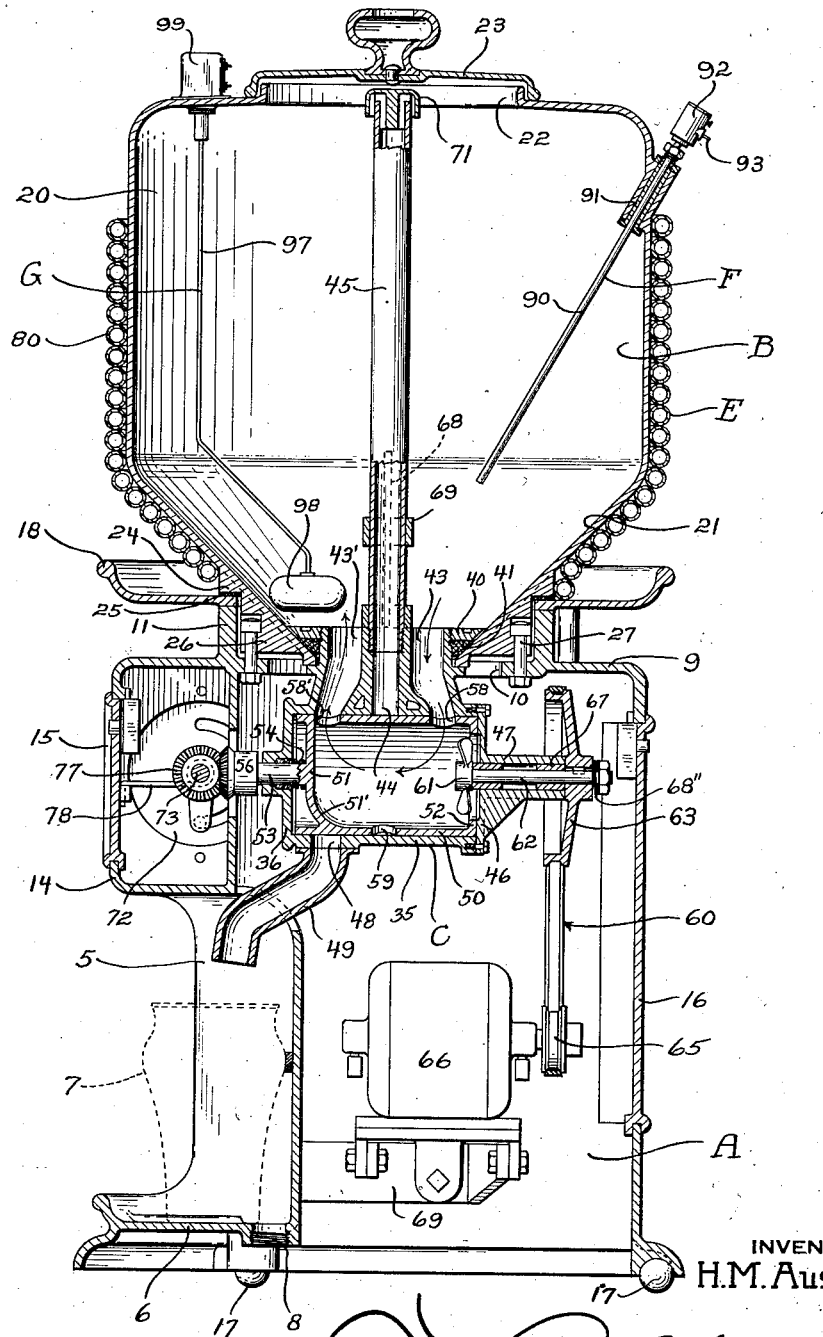

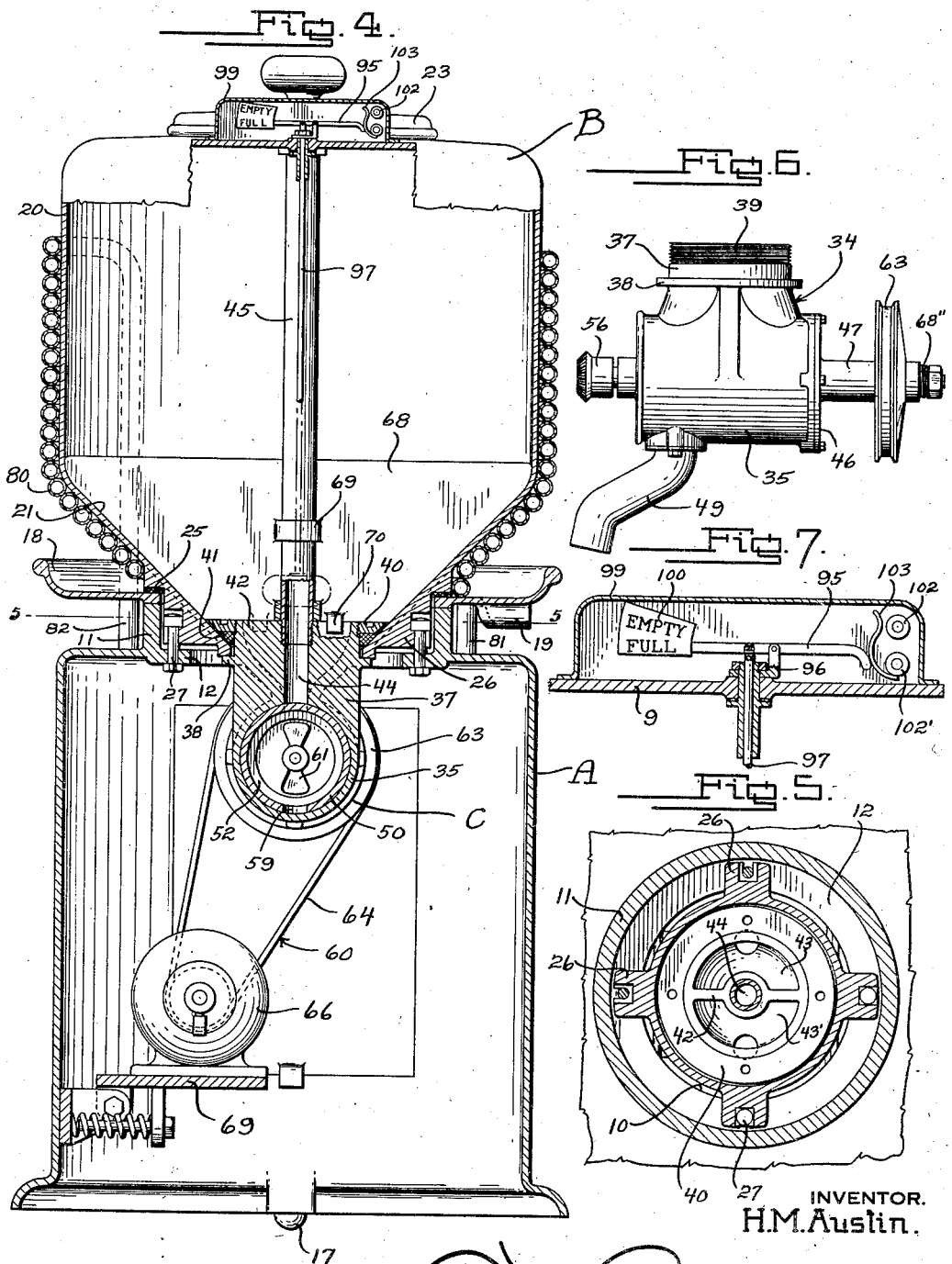

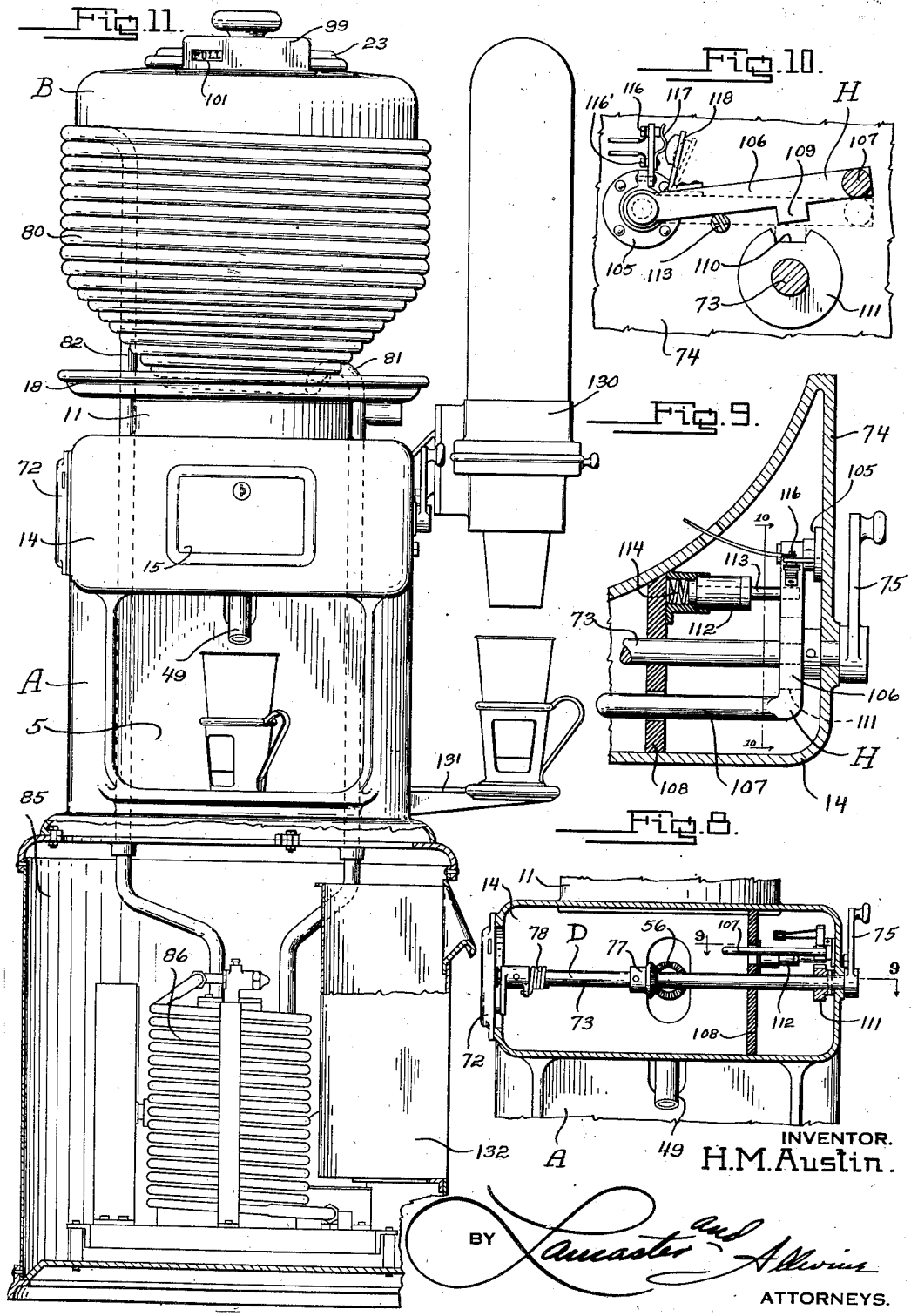

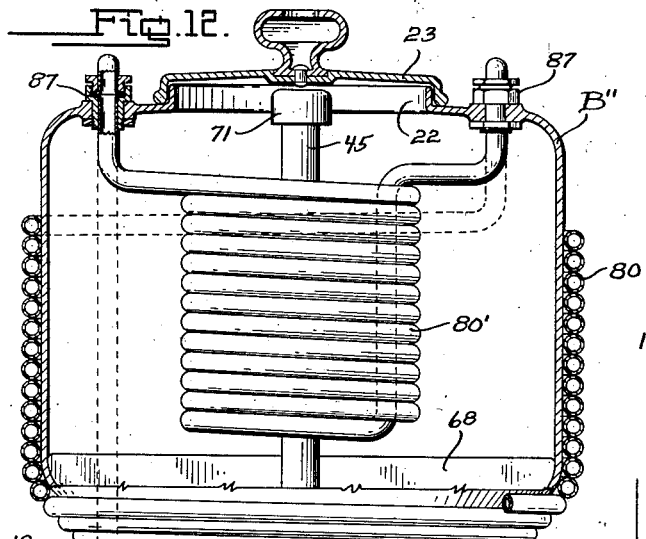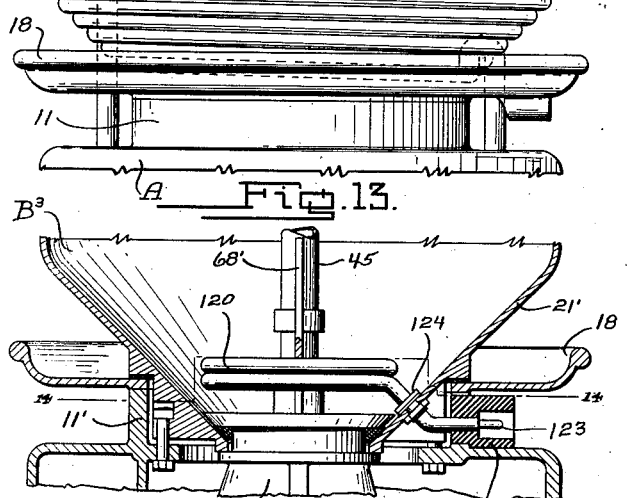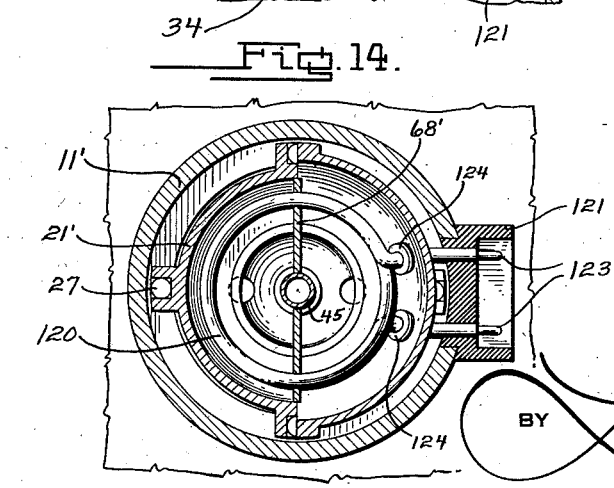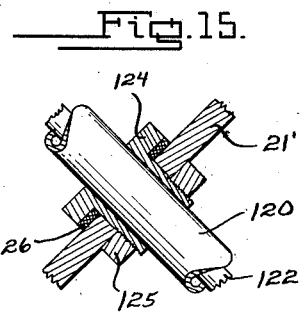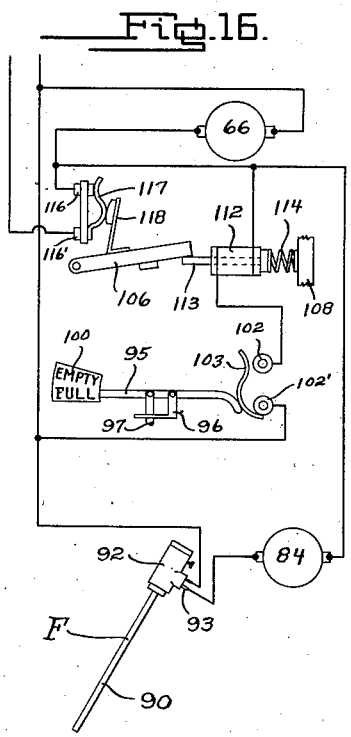
INVENTOR.
H.M.Austin.
ATTORNEYS.

1,836,893

UNITED STATES PATENT OFFICE

HARRY MESSNER AUSTIN, OF PHILADELPHIA, PENNSYLVANIA, ASSIGNOR TO I. FISCHMAN & SONS, OF PHILADELPHIA, PENNSYLVANIA, A CORPORATION

PREMIXED DRINK DISPENSER

Application filed July 31, 1929. Serial No. 382,409.

The present invention relates to liquid dispensing apparatus and the primary object of the invention is to provide improved apparatus for dispensing premixed drinks or beverages such as cocoa, chocolate, malted milk, etc., and like beverages of such nature and ingredients as will deposit if left to remain in a state of rest.

A further object of the invention is to provide a premixed drink dispenser wherein the liquid is constantly agitated and thereby preventing precipitation of any of the ingredients of the drink or beverage.

A further object of the invention is to provide a self-measuring premixed drink dispenser having means for causing continuous circulation of the liquid in the supply container, with means for retaining the liquid at a given temperature.

A further object of the invention is to provide a self-measuring premixed drink dispenser embodying dispensing means for discharging a measured quantity of the liquid in an inflated state and of a creamy consistency.

A further object of the invention is to provide a self-measuring premixed drink dispenser embodying means for discharging measured quantities of the liquid from a measuring receptacle with an air current; insuring complete discharge of the liquid from the receptacle and precluding all after dripping from the delivery outlet.

A still further object of the invention resides in the provision of a check or coin controlled liquid dispensing apparatus embodying automatic cooling means for maintaining the liquid at a low degree of temperature.

A still further object of the invention resides in the provision of a premixed drink dispenser which may be readily converted for dispensing either hot or cold drinks.

A still further object of the invention resides in the provision of a check or coin controlled liquid dispensing apparatus embodying automatically operable means for locking the apparatus against operation when the liquid container has been emptied.

A still further and important object of the invention is to provide a premixed drink dispensing apparatus embodying a readily interchangeable measuring and dispensing unit including means for constantly agitating the liquid in the measuring chamber of the unit.

Other objects and advantages of the invention will be apparent from the following detailed description taken in connection with the accompanying drawings and in which drawings:

Figure 1 is a front elevation of the improved premixed drink dispenser.

Figure 2 is a side elevation of the same and showing a fragmentary portion of the liquid container broken away to illustrate the float controlled valve for retaining the liquid in the container at a given level.

Figure 3 is a central vertical section thru the improved dispensing apparatus and showing a slightly modified and smaller type of liquid container, the container not having a connection to a supply tank as is the container shown in Figure 2.

Figure 4 is a central vertical section thru the dispenser taken at a right angle from the section illustrated in Figure 3.

Figure 5 is a fragmentary horizontal section substantially on the line 5—5 of Figure 4 showing the manner of mounting the liquid container upon the supporting base.

Figure 6 is a side elevation of the dispensing unit assembly removed from the apparatus.

Figure 7 is a detail sectional view of the indicator and float controlled switch operable for locking the machine against operation when the liquid container has been emptied.

Figure 8 is a fragmentary section on the line 8—8 of Figure 2.

Figure 9 is an enlarged fragmentary section substantially on line 9—9 of Figure 8.

Figure 10 is an enlarged fragmentary section substantially on the line 10—10 of Figure 9.

Figure 11 is a front elevation of the dispenser provided with a stand housing refrigerating apparatus, the dispenser also being provided with a cup dispenser.

Figure 12 is a fragmentary vertical section thru the upper portion of the dispenser and showing an additional inner cooling coil for the liquid.

Figure 13 is a fragmentary detail sectional view showing the liquid container provided with a heating unit.

Figure 14 is a section on line 14—14 of Fgure 13.

Figure 15 is an enlarged fragmentary detail section showing the manner in which the heating unit is led thru the lower portion of the liquid container.

Figure 16 is a wiring diagrammatic view of the automatic control devices of the dispenser.

Referring to the drawings in detail, and wherein similar reference characters designate corresponding parts thruout the several views, the letter A designates a base supporting a liquid receptacle or container B for the drink or beverage to be dispensed. The letter C designates combined measuring and dispensing means for the liquid container B and operable by the control means D. E designates cooling means for the liquid in the container A; F temperature control means for the liquid; G circuit closing indicator means; and H automatic locking means for the dispenser control means D.

The base A is in the form of a hollow casing having a recess 5 provided in its front or face side forming at its lower end a shelf 6 having a flange extending about its outer edge, and this shelf provides a support for a glass or other suitable drinking receptacle 7 to receive the dispensed liquid. The shelf at the lower end of the recess or pocket 5 may be provided with a suitable drain opening 8 if found desirable. The top wall 9 of the casing is provided with an opening 10 about which extends an upwardly projecting annular flange 11 which is of slightly greater diameter than the opening 10 forming an inturned annular attaching flange 12. At the front side of the base above the recess 5 the casing is formed to provide a coin box 14 provided with a removable door 15. At the rear side of the base is provided a relatively large door 16 for permitting ready placing, removal or inspection of the apparatus contained in the hollow base. As shown in Figures 1 to 4 inclusive and wherein the base has been illustrated for use upon a counter or the like, the base may be provided with suitable feet 17.

Adapted to rest upon the upper edge of the annular flange 11 is a suitable drip pan 18 which may be provided with a suitable drain outlet 19 to which a suitable conductor may be connected for conveying water and the like from the pan 18. The pan 18 has an opening therethru of a diameter equal to the internal diameter of the flange 11.

Referring particularly to Figures 3, 4 and 5, the receptacle or container B is in the form of a cylindrical tank or bowl and may be formed either of a transparent material or either be of porcelain or white enameled metal. The tank or bowl embodies a cylindrical body portion 20 having a conical shaped or tapering lower end 21 providing a reduced open lower end for the tank. The upper end of the tank or bowl is substantially flat and is provided at its axial center with an opening 22 having an upturned flange thereabout providing a retaining means for a removable lid 23. The opening 22 in the type of liquid tank or bowl shown in Figures 3 and 4 provides a filler opening and also permits insertion of parts to be later described, into the tank. Formed upon the outer side of the tapering lower end of the liquid tank is an annular rest shoulder 24 for engaging upon an anular gasket 25 disposed about the opening thru the drip pan 18. This gasket 25 will prevent escape of drippings in the pan 18. Formed below the annular shoulder 24 is a series of radially projecting attaching lugs 26 suitably slotted at their outer ends for receiving the heads and shanks of attaching bolts 27 with the lower threaded ends of the bolt shanks projecting thru suitable openings in the inturned attaching flange 12 to receive nuts which when tightened against the under side of the flange 12 will firmly mount the receptacle B upon the upper side of the base A with the lower open end of the receptacle aligning with the opening 10 in the base top wall 9.

In Figures 1 and 2, the liquid receptacle or tank B' is provided preferably in its top wall with an inlet sleeve 28 for attachment of a supply pipe 29 leading to a suitable storage or supply tank. The liquid level in the tank B' may be controlled by a suitable float 30 operating a valve plunger 31 for controlling entrance of liquid from the supply pipe 29. It will of course be understood that if so desired the tanks or liquid receptacles B shown in Figures 3 and 4 may also be provided with a supply inlet controlled by a float valve if so desired.

The combined measuring and dispensing means C for disposition within the hollow base A, includes a detachable and removable dispensing unit assembly 34 adapted to be supported in the upper portion of the hollow base upon the lower end of the liquid tank or receptacle B. The dispensing unit assembly 34 embodies a hollow cylindrical housing 35 disposed horizontally and closed at its forward end by a flat end wall 36 provided with an axially disposed opening. Cast integral with the housing 35 is an upstanding coupling extension 37 provided with an external flange 38 and above the flange is circular in formation and externally screw threaded as at 39. The coupling extension 37 above the flange 38 is of a diameter to fit upwardly thru the lower open end of the tank B with the flange 38 engaging the lower end of the tank to act as a stop flange. Threaded upon the thread 39 is a suitable ring nut 40 beneath which is disposed a gasket or washer 41 for connecting the dispensing unit with a sealed joint to the lower end of the tank B. The hollow coupling extension 37 is provided with a transversely extending partition 42 providing circulation ways 43 and 43' being substantially semi-circular at their upper ends and having their lower ends converging into circular passageways opening into the upper side of the housing 35 adjacent the front and rear end portions of the housing. Thus it will be seen that the circulation passageways 43 and 43' form independent passageways between the lower end of the receptacle B and the dispensing unit housing 35. The central portion of the partition 42 is enlarged to provide a vent duct 44 being internally threaded at its upper end for threaded reception of the lower end of a combined wash-out and air vent tube 45 projecting upwardly thru the bank B to a location adjacent the upper end of the tank.

Removably attached to and closing the rear end of the cylindrical housing 35 is a head 46 provided with an axially disposed tubular bearing extension 47. Provided in the lower side adjacent the forward end of the housing 35 in vertical alignment beneath the lower end of the passageway 43' is an outlet opening 48 opening into a delivery spout 49 attached to the under side of the housing. The delivery spout 49 projects forwardly thru a suitable opening provided in the upper portion of the rear wall defining the recess 5 and has its forward lower end downturned for directing the liquid into a glass or the like 7 placed upon the shelf 6 for receiving the dispensed liquid.

Rotatably mounted within the cylindrical housing 35 is a measuring drum or cylinder 50 having a wall 51 closing its forward end and having an inturned flange 52 at its rear end forming a bearing flange for engagement with the head 46. Projecting forwardly from the wall 51 is a stem 53 for rotation in the housing end wall 36. As shown in Figure 3 a suitable packing may be disposed about the stem 53 and a coil spring 54 may encircle the stem between the packing and wall 51 for normally urging the bearing flange 52 into engagement with the head 46. The end wall 51 is arcuated at one side as at 51' and for a purpose to be subsequently set forth. Fixedly mounted upon the forward end of the stem 53 to project thru a suitable opening into the coin box 14 is a bevel gear 56.

Provided in longitudinal alignment in one side of the measuring drum 50 are openings 58 and 58' of circular formation for respectively registering with the lower ends of the circulation passageways 43 and 43' when the measuring drum is in its normal or non-discharging position. Provided in the measuring drum substantially midway the ends thereof and at a location diametrically opposite to the openings 58 and 58' is a vent opening 59 for registering with the lower end of the vent duct 44 when the measuring drum is in its discharging position. As will be observed in Figures 3 and 4 the vent opening 59 is normally closed by the housing 35 until moved into alignment with the vent duct 44. When the openings 58 and 58' are registering with the circulation ways 43 and 43' the outlet opening 48 is closed.

The combined measuring and dispensing means C includes in addition to the dispensing unit assembly 34, combined circulation and expelling means 60 for constantly agitating and circulating the liquid when the measuring drum is in its normal position and for complete discharging of the liquid from the measuring drum when in a discharging position. This means 60 includes an impeller 61 arranged in the rear portion of the measuring drum 50 and affixed to the end of a shaft 62 suitably journaled in the bearing extension 47. Keyed to the rear end of the shaft 62 beyond the bearing extension 47 is a grooved belt wheel 63 over which is trained a belt 64 leading to a belt wheel 65 carried upon the armature shaft of an electric motor 66. The shaft 62 is preferably mounted in wooden bushings 67 and the wheel 63 is keyed with a sliding fit upon the shaft. A spring 68" acting upon the wheel 65 tends to normally urge the shaft 62 rearwardly and the impeller 61 into contact with the front bearing 67 as to prevent leakage.

The electric motor 66 is preferably mounted upon a spring urged bracket 69 for maintaining an even tension upon the belt 64. Operation of the motor 66 will tend to revolve the impeller 61 arranged in the rear portion of the measuring drum 50.

Arranged in the lower portion of the liquid tank or receptacle B is a deflector plate or baffle 68' having its ends engaging the inner surface of the tank and provided at its central portion with a sleeve 69 for sliding movement on the vent tube 45. This baffle plate 68' is of a height slightly less than the height of the tapering lower portion 21 of the tank and is provided at its lower edge with positioning fingers 70 which engage over the partition 42 for preventing rotation of the baffle plate and retains the plate in alignment with the partition. Rotation of the impeller 61 will cause circulation of the liquid thru the measuring drum in the direction of the arrows shown in Figure 3 and this circulation of the liquid will prevent deposit in the measuring drum. The baffle plate 68' will cause circulation of the liquid in the tank B.

The upper end of the vent tube 45 is provided with a removable cap 71 of a construction to allow ready entrance of air from the upper portion of the liquid tank into the vent tube, and removal of the cap permits thorough washing of the measuring drum thru admitting a force of water thru the vent tube.

The control means D for rotation of the measuring drum 50 is arranged in the coin box 14 and upon operation imparts rotation to the measuring drum 50 thru 180°. The means D embodies a coin or check released device 72 of any approved construction and which is mounted externally of the left hand end of the coin box 14. Journaled at one end, and operatively connected to the device 72 is a control shaft 73 having its opposite end projecting thru the right hand end wall 74 of the coin box and carrying a suitable operating crank 75 for manually imparting rotation to the control shaft. Suitable stops or projections 76 are provided for limiting operation of the crank 75 thru more than 180°. Affixed to the shaft 73 is a bevel gear 77 for meshing engagement with the bevel gear 56, and the gear 77 is of a like size as that of the gear 56. A suitable spring 78 acts upon the shaft 73 for returning the crank 75 to its normal position as shown in Figure 2, and in which position the measuring drum 50 is in its loading position as shown in Figure 3. While the dispensing apparatus has been shown provided with the coin or check device 72 for permitting operation of the dispenser, it is to be understood that when the apparatus is not intended for public use that the control device 72 may be dispensed with to permit free operation of the crank 75 by a salesman or the like dispensing the drinks.

The cooling means E, reference being had particularly to Figures 1, 2, 3, and 4, comprises a cooling coil 80 wound spirally about the exterior of the liquid tank or receptacle B or B' above the drip pan 18 and with the coil conforming to the external configuration of the receptacle. The lowermost convolution of the coil may be connected by a conductor 81 which extends upwardly over the edge of the drip pan 18 and extends downwardly along the rear side of the base A at one side of the door 16. The uppermost convolution of the coil 80 is connected by a conductor 82 which also extends downwardly to the lower end of the base A. The lower ends of the pipes or conductors 81 and 82 may be led off in any desired direction for connection with any suitable form of compressor located remote from the dispenser. The cooling medium for circulation in the cooling coil may of course be a brine, gas, or any other well known solution as now in common use. In the diagrammatic showing in Figure 16, 84 may indicate an electric motor operating the compressor supplying the cooling medium to the cooling coil 80. The cooling coil 80 as will be observed encircles the lower portion of the liquid receptacle and in operation the coil will become frosted presenting a neat and appealing display of the dispenser. Any drippings from the cooling coil will be collected in the drip pan 18.

In Figure 11 and wherein is shown a self-contained cold drink dispensing apparatus, the base A is shown supported upon a suitable hollow stand 85 enclosing the electrically operated compressor 86 to which the coil connection pipes 81 and 82 may be connected.

In Figure 12 an arrangement has been shown whereby additional cooling of the liquid may be obtained thru the connecting of an inner cooling coil 80' in circulation with the outer cooling coil 80. The liquid tank or receptacle B'' shown in Figure 12 may have two openings in its top wall permitting coupling of the inner and outer coils 80' and 80 respectively by means of the couplings 87. The inner coil 80' is of a diameter permitting insertion of the coil thru the opening in the top of the receptacle.

Referring now to the temperature control means F, the same is preferably in the form of a pyrometric switch embodying a rod 90 mounted in an angular position in the tank B as by means of a bushing 91 to extend into the liquid in the tank. The upper outer end of the rod 90 projects thru the wall of the tank above the cooling coil and carries a head piece 92 provided with any conventional type of circuit closer operable thru variation of the temperature of the liquid in the tank. The circuit closer in the head piece is provided with suitable terminals 93 whereby electrical connection may be had to the control switch. As shown in the wiring diagram in Figure 16 the control switch is connected in series with the motor 84 of the compressor unit for the cooling means so that the switch will operate for controlling operation of the cooling means to maintain the liquid in the supply tank at an even temperature.

The indicator means G for indicating whether the liquid tank is full or empty, and also acting to operate the locking means H, embodies an indicator arm or lever 95 pivotally mounted intermediate its ends as upon a suitable bracket 96 upon the upper or top wall of the receptacle B. Vertically movable thru the top receptacle wall is a float rod 97 being offset at its lower end toward the axial center of the liquid receptacle and carrying at its lower end a suitable float 98 disposed immediately above the lowermost portion of the receptacle. The upper end of the float rod is connected with a pin and slot coupling to the indicator lever 95 so that upon vertical movement of the float rod the lever will be moved about its pivotal axis. The lever 95 is mounted in a suitable housing 99 and at one end carries an indicator plate 100 having suitable indicia thereon as shown in Figure 7 for display at the sight opening 101 provided in the housing 99. The liquid in the tank will normally tend to raise the float 98 so that the indicator plate 100 will display the word "Full" at the sight opening 101 and when the liquid receptacle is practically empty the float 98 will lower for displaying the word "Empty" at the sight opening.

The indicator means G also acts as a circuit closing means for causing operation of the locking means H, and mounted in the housing 99 adjacent one end thereof opposite to the indicator plate 100 are a pair of terminals 102 and 102' to one of which is connected a spring contact arm 103 having its free end normally out of electrical contact with the terminal 102. One end of the intermediately pivoted lever 95 has bearing engagement with the spring contact 103 in a manner whereby upon lowering of the float 98 the free end of the contact arm will be moved into electrical contact with the contact 102 for completing an electric circuit to the locking means H.

The locking means H for automatically rendering the machine inoperative after all of the contents of the liquid receptacle B has been dispensed, embodies an automatically operable circuit closing means arranged in one end of the coin box 14 for locking the control shaft 73 against rotation. Pivotally mounted upon the inner side of the end coin box wall 74 as upon a suitable bracket 105 is a locking arm 106 having its free end traversing the control shaft 73. The forward free end of the arm 106 is provided with a handle portion 107 extending parallel with the shaft 73 and projecting slightly thru a partition 108 extended across one end portion of the coin box. Formed on the under side of the arm 106 is a lug 109 for engaging in a notch or recess 110 provided in the periphery of the locking disc 111 fixedly secured to the control shaft 73. The disc 111 is secured to the shaft 73 in a position whereby the notch 110 will be disposed uppermost of the disc when the shaft is in its normal position of rest. Mounted upon the partition 108 is a solenoid embodying a coil winding 112 provided with a movable core 113 normally spring urged outwardly by a spring 114 acting upon the inner end thereof so that the outer end of the core is normally urged to a position beneath the locking arm 106 and so retains the arm elevated as to retain the lug 109 free of the locking disc 111 as clearly shown in Figure 10. Energizing of the solenoid will act to retract the core 113 and allow the arm 106 to drop by gravity so that the lug 109 drops into the recess 110 and prevents rotation of the control shaft 73. The core 113 is so arranged that when the arm 106 is lowered into a locking position the ends of the core will abut against the side of the arm after the solenoid is deenergized. By observing Figure 16 it will be seen that when electrical contact is made between the contacts 102 and 102' by the spring contact arm 103 that the coil winding 112 of the solenoid will be energized and retract the core 113.

Insulatively mounted upon the bracket 105 is a pair of contacts 116 and 116' the contact 116' having connected thereto a spring contact strip 117 normally urged out of electrical contact with the contact 116. Mounted upon the upper side of the locking arm 106 is a switch operating bracket 118 having a head piece formed of a suitable insulating material for engagement with the metallic contact strip 117. In Figure 10 it will be seen that when the locking arm 106 is in its normal raised position that the bracket arm 118 engages the contact strip 117 in a manner for normally maintaining a closed circuit in the contacts 116 and 116'. Lowering of the arm 106 allows opening of the circuit between the contacts 116 and 116' and breaks electrical connection with all of the electrical apparatus of the dispenser.

Referring particularly now to Figures 13, 14 and 15, an arrangement has been shown whereby the dispenser may be used for dispensing hot liquids or beverages thru the provision of a suitable heating unit arranged in the lower portion of the liquid receptacle or tank B$^s$. The heating unit includes a tubular heating coil 120 encircling the vent tube 45 in the lower end of the liquid receptacle with opposite ends of the coil extended thru the lower tapering portion 21' of the receptacle and into a suitable socket 121 mounted in the flange 11' beneath the drip pan 18. Enclosed in the tubular heating coil 120 is a suitable resistance heating unit 122 having its terminals 123 opening into the socket 121 for electrical connection with any suitable electrical supply line. The coil 120 where it projects thru the casing wall 21' is sealed against leakage by means of a bushing 124 which is soldered or otherwise secured to the ends of the coil and has its outer end threaded for reception of a clamping nut 125. A gasket 126 is preferably disposed between the head of the bushing and the receptacle wall 21'. The lower end of the baffle plate 68' may be slotted at two places to accommodate the convolutions of the coil 120 when the plate is lowered on the vent tube 45. The degree to which the liquid in the receptacle is heated may be automatically controlled by the control means F connected in circuit with the heating unit.

If so desired the heating unit may be incorporated in a dispenser with the cooling means so that with slight alterations the dispenser may be used for dispensing either hot or cold drinks.

Referring once again to Figure 11 and wherein an arrangement has been shown adapting the dispenser for public use, a cup dispenser 130 has been shown mounted upon one side of the base A, and beneath which a suitable bracket 131 may be mounted for receiving the cup dispensed from the cup container. The stand 85 may be provided with a removable receptacle 132 provided with an opening for receiving the empty cups. The dispenser shown in Figure 11 will be check or coin controlled so that a person may operate the machine upon insertion of a proper coin or check into the coin device 72. Figure 11 shows a dispenser which will be entirely self-contained for automatically dispensing predetermined quantities of cold premixed drinks.

In operation of the self-measuring premixed drink dispenser, the liquid receptacle or tank is filled with the ready mixed drink or beverage to be dispensed, and the attendent upon opening of the coin box door 15 grasps the handle portion 107 of the locking arm 106 and raises the same to a position as shown in Figure 10 and in which position the locking arm will be held by the solenoid core 113 projected by the spring 114. This raising of the locking arm 106 closes the contact strip 117 completing an electrical circuit and placing the machine in operation. As shown in Figure 16, closing of the switch arm 117 completes circuits to the motors 66 and 84 and to the temperature control means F in series with the motor 84. The motor 84 will be automatically controlled for cooling the liquid in the receptacle. The motor 66 is at once set in operation rotating the impeller 61 and constantly causing a circulation of the liquid thru the combined measuring and dispensing means in the direction of the arrows shown in Figure 3. This continuous circulation will prevent deposit of any of the ingredients of the beverage in the dispensing unit measuring drum. With the drum in its normal position as shown in Figure 3 the arcuate end wall portion 51' acts to deflect the circulating liquid upwardly thru the circulation way 43'. The liquid receptacle now being filled with the continuously circulated liquid acts to buoy the float 98 upwardly displaying the word "Full" at the indicator sight opening 101 and maintaining the contact strip 103 out of electrical connection with the contact 102.

The operator after placing a suitable glass or cup beneath the outlet of the delivery spout 49 then grasps the operating handle 75 for rotation of the shaft 73 which may be either coin released or freely rotatable in accordance with the operating conditions of the dispenser. Limited rotation of the shaft 73 thru 180° imparts a one-half complete revolution to the measuring drum 50 aligning the vent opening 59 with the lower end of the vent duct 44 and the opening 58' with the outlet opening 48. The rotating impeller 51 now discharges the liquid from the measuring drum and at the same time mixes with the liquid, air drawn thru the vent tube 45 so that the drink is dispensed in an inflated and creamy state. Complete discharge of the measuring drum is insured thru gravity and thru action of the impeller 61 the air forced thru the delivery spout 59 by the impeller 61 precludes any dripping from the spout. The operator may then release the crank 75 and allow the spring 78 to rotate the control shaft 72 in a counter direction and return the measuring drum to its normal position in communication with the liquid receptacle. The impeller 61 will now insure filling of the measuring drum thru the forced circulation of the liquid thru the circulation ways 43 and 43'.

Should the liquid in the liquid receptacle be lowered to an extent that there is insufficient liquid in the receptacle for completely filling the measuring drum, the float 98 will lower moving the contact 103 into bridging relation with the contact 102 and complete a circuit to the coil 112 so as to retract the armature 113. Retraction of the armature or core 113 allows the locking arm 106 to drop by gravity and lock the control shaft 73 against rotation. Lowering of the locking arm 106 also breaks the contact of the switch arm 117 to the contact 116 opening all electrical circuits of the apparatus and preventing operation thereof until the liquid receptacle is again refilled and the locking arm raised from a locking position.

The ready attachment and removal of the dispensing unit assembly 34 will permit substitution of different dispensing unit assemblies for dispensing different quantities of liquid.

From the foregoing it will be apparent that a novel and improved liquid dispensing apparatus has been disclosed rendering the apparatus especially well adapted as a self-measuring premixed drink dispenser for dispensing drinks or beverages having a tendency to desposit if left in a state of rest. It will also be apparent that a novel apparatus has been disclosed embodying a combined circulation and expelling means insuring against sedimentation of any of the ingredients of the drink and discharging a measured quantity of the liquid in an inflated state and of a creamy consistency. It will further be apparent that a wholly automatically operable dispensing apparatus has been disclosed and embodying a novel arrangement wherein the circulating means for continuous circulation of the liquid also acts to preclude any dripping from the delivery spout after discharge of a measured quantity of the liquid.

Changes in detail may be made to the form of invention herein shown and described, without departing from the spirit of the invention or the scope of the following claims.

I claim:

1. A liquid dispensing apparatus comprising a liquid receptacle, a dispensing unit in communication with the lower end of the receptacle, and means for preventing deposit of the liquid in the dispensing unit embodying an impeller for constant circulation of the liquid between the receptacle and dispensing unit.

2. A liquid dispenser comprising a liquid receptacle, a dispensing unit having separate ways forming communication between the dispensing unit and the bottom of the receptacle, and an impeller in the dispensing unit for continuous circulation of the liquid between the receptacle and dispensing unit thru said ways.

3. A liquid dispenser comprising a liquid receptacle, a dispensing unit supported in the lower end of the receptacle including a rotatable measuring drum having communication thru separate spaced apart ways with the liquid receptacle when the drum is in its non-discharging position, means for rotating the measuring drum to a discharging position, and combined circulation and expelling means for the dispensing unit including an impeller operating in the measuring drum.

4. A liquid dispenser comprising a liquid receptacle, a dispensing unit including a rotatable measuring drum having communication adjacent opposite ends thru independent ways with the bottom of the liquid receptacle, control means for rotation of the drum, a delivery spout for communication with one end of the drum when rotated to a discharging position, and a combined circulating and expelling impeller rotatable in one end of the measuring drum.

5. A liquid dispensing apparatus comprising a hollow base, a liquid receptacle supported above the base, a dispensing unit supported from the lower end of the receptacle in the base embodying a rotatable measuring drum having communication adjacent its front and rear ends thru independent ways with the receptacle, a delivery spout extending forwardly thru the base for communication with the measuring drum when rotated to a discharging position, means for rotating the drum, an impeller rotatable in the rear portion of the measuring drum, and means in the hollow base for continuous rotation of the impeller.

6. In a premixed drink dispenser the combination with a base, a liquid receptacle supported upon the base, combined measuring and dispensing means in the base including a dispensing unit embodying a measuring drum, and combined circulation and expelling means for the liquid, cooling means for the liquid, control means for the dispensing means, and float operated locking means for the control means embodying a magnetically released locking arm and circuit maker and breaker means for breaking an electric circuit to operating electric motors of the combined measuring and dispensing means and said cooling means upon release of the locking arm.

7. A self-measuring premixed drink dispenser comprising a base, a liquid receptacle supported on the base, a dispensing unit in the base including a rotatable measuring drum having communication with the receptacle and an impeller rotatable in the drum, an electric motor in the base for rotating the impeller, control means for rotating the measuring drum, electrically operated cooling means for the liquid receptacle, float controlled circuit closing means operable for closing a circuit upon lowering of the liquid level in the receptacle below a given point, a locking arm for the control means, magnetically operated release means for the locking arm and energized upon completion of a circuit by the float controlled circuit closing means, and circuit maker and breaker means operable upon movement of the locking arm into a locking position for opening all electric circuits of the dispenser apparatus.

8. In a premixed drink dispenser, the combination of a liquid receptacle, a dispensing unit in communication with the receptacle including an impeller rotatable in the unit for circulation and expelling of the liquid and motor driven operating means for the impeller, control means for manually operating the dispensing means, locking means for the control means, electrically operated release means for the locking means operable upon depletion of the liquid in the receptacle, and circuit opening means operable upon release of the locking means for breaking the electric circuit to the motor operating said impeller.

9. In a self-measuring premixed drink dispenser the combination of a liquid receptacle, a dispensing unit in communication with the bottom of the receptacle including constantly operable impeller means, control means for the dispensing unit including a control shaft, a peripherally notched locking disc affixed on the shaft, a locking arm pivoted above the disc and having a projection on its lower side engageable in the peripheral notch of the locking disc, magnetically released means normally retaining the locking arm out of engagement with the locking disc, and float controlled circuit closing means for operation of the magnetic release means upon depletion of the liquid in the receptacle.

10. In a self-measuring premixed drink dispenser the combination of a liquid receptacle, a dispensing unit in communication with the bottom of the receptacle including constantly operable impeller means, control means for the dispensing unit including a control shaft, a peripherally notched locking disc affixed on the shaft, a locking arm pivoted above the disc and having a projection on its lower side engageable in the peripheral notch of the locking disc, magnetically released means normally retaining the locking arm out of engagement with the locking disc, circuit closing means operable for energizing the magnetic release means upon depletion of the liquid in the receptacle, and switch means operable upon release of the locking arm for breaking the circuit to the magnetic release means.

11. A premixed drink dispenser comprising a hollow base having a recess provided in its front side and a compartment above the recess, a liquid receptacle removably supported upon the upper side of the base, a dispensing unit supported upon the lower end of the receptacle in the hollow base including a rotatable measuring drum having communication thru independent ways with the receptacle, and a delivery spout for the unit opening thru the front of the base at the upper side of said recess, a control shaft mounted in said compartment for rotation of the measuring drum and provided with an operating crank externally of one end of the compartment, combined circulation and expelling means in the hollow base including an impeller rotatable in one end of the measuring drum, and a vent tube opening into the measuring drum when in a discharging position out of communication with the liquid receptacle.

12. In a premixed drink dispenser the combination of a base, a liquid receptacle detachably supported upon the upper side of the base, a dispensing unit in the base including a horizontally mounted rotatable measuring drum having communication at its front and rear portions thru independent ways with the bottom of the liquid receptacle and a delivery spout opening thru the lower forward end of the unit, means for rotating the measuring drum, combined circulation and expelling means embodying an impeller rotatable in the rear end of the measuring drum, a vent duct for communication with the measuring drum when in a discharging position, cooling means including a cooling coil spirally encircling the liquid receptacle, a drip pan encircling the receptacle beneath the cooling coil.

13. In a premixed drink dispenser the combination of a base having an opening in its upper side providing an annular attaching flange and an upstanding ring flange encircling the attaching flange, a liquid receptacle supported on the ring flange and having slotted attaching lugs overlying the attaching flange, mounting bolts connecting the receptacle by the attaching lugs to said attaching flange, a dispensing unit in the base, means detachably coupling the unit to the lower end of the receptacle, said unit having independent ways communicating with the receptacle, a delivery spout, and a rotatable measuring drum for alternately registering with said ways and said spout, an impeller for rotation in one end of the measuring drum, a vent duct for the drum when in a discharging position, control means for rotation of the drum, and cooling means for the liquid including a cooling coil encircling the liquid receptacle.

14. In a premixed drink dispenser the combination of a base provided with a coin box compartment, a liquid receptacle mounted upon the upper side of the base, a dispensing unit supported beneath the receptacle in communication therewith at one side of the coin box and including a horizontally mounted rotatable measuring drum provided with a stem projecting into the coin box compartment and carrying a bevel gear, a coin released control shaft rotatably extending thru the coin box compartment, a bevel gear on said shaft for meshing with the bevel gear of said measuring drum, an operating crank on the shaft externally of the base for limited rotation of the drum to a discharging position, and spring means for return rotation of the shaft.

15. In a premixed drink dispenser the combination of a liquid receptacle, a dispensing unit including a measuring cylinder having communication thru independent ways with the lower end of the receptacle, a baffle traversing the receptacle between said ways, and combined circulation and expelling means embodying an impeller operating in one end of the measuring drum.

16. In a premixed drink dispenser the combination of a liquid receptacle, a dispensing units including a rotatable measuring drum having communication adjacent opposite ends thru independent ways with the lower portion of the receptacle, a vent duct for communication with the measuring drum when in a discharging position, a vent tube communicating with the duct and extending upwardly thru the receptacle between said ways, a baffle plate supported on said tube to traverse the lower portion of the receptacle between said ways, an impeller rotatable in one end of the measuring drum, and means for constantly rotating the impeller for circulation of the liquid when the drum is in communication with the liquid receptacle and discharging the contents of the drum when in a discharging position in communication with the vent duct.

17. In a premixed drink dispenser the combination with a liquid receptacle having an opening in its lower end, of combined measuring and dispensing means for the liquid comprising a dispensing unit embodying a housing and a coupling extension, means connecting the coupling extension in the opening of the liquid receptacle, a partition in the coupling extension providing independent ways forming communication between the housing and receptacle, a vent duct in said partition communicating with the housing, a vertical vent tube communicating with the vent duct, a baffle plate supported on the vent tube to traverse the lower portion of the liquid receptacle in alignment above the partition, means for retaining the baffle plate in alignment with the partition, and a measuring drum rotatable in the housing having independent openings for alignment with said ways and a vent opening diametrically of said first mentioned openings for alignment with said vent duct.

18. In a premixed drink dispenser the combination with a liquid receptacle having an opening in its lower end and supporting means for the receptacle, of combined measuring and dispensing means for the receptacle comprising a dispensing unit embodying a horizontal cylindrical housing having a vent duct at its upper side and a wall closing its forward end, a coupling extension forming separate communication ways between the receptacle and housing, means connecting the extension with a sealed joint in the opening in said receptacle, a head closing the rear end of the housing and provided with a tubular extension, a measuring drum rotatably fitting in said housing having an open rear end and a wall closing its forward end, a control stem carried by the front end wall of the measuring drum and journaled in the end wall of the housing, said measuring drum having longitudinally aligning openings for alignment with said ways when the drum is in a loading position and a vent opening diametrically of the longitudinally aligning openings for alignment with said vent duct when the drum is in a discharging position, an outlet opening thru the housing for registering with one of said way aligning openings, a shaft journaled in said tubular extension of said head, and an impeller carried by the inner end of the shaft and rotatable in the rear end of said measuring drum.

19. In a combined measuring and dispensing unit for liquid receptacles the combination of a dispensing unit for attachment to the lower end of the receptacle embodying a horizontal cylindrical housing, a coupling extension for connection with the receptacle having independent ways forming communication between the receptacle and housing, and a vent duct, a measuring cylinder rotatable in the housing and having openings adjacent each end for alignment one with said ways, and a vent opening for alignment with said vent duct, said vent opening thru the lower portion of the housing, means for rotating the measuring cylinder for alternately aligning said inlet openings with said inlet ways and a vent opening with said vent ducts and one of said inlet ways with said outlet opening, an impeller rotatable in the measuring cylinder at an end thereof opposite to said outlet opening, and means for imparting rotation to said impeller.

20. In a combined measuring and dispensing means for liquid receptacles containing premixed liquid, a dispensing unit including a horizontally disposed cylindrical housing having independent circulation ways forming communication between the receptacle and points adjacent opposite ends of the upper side of the housing, an outlet opening in the housing in vertical alignment beneath the foremost circulation way, a vent duct opening into the housing between the circulation ways, a measuring drum rotatable in said housing, inlet openings provided adjacent opposite ends of the cylinder for alignment with the lower end of the circulation ways, a vent opening provided in the cylinder diametrically of the inlet ways for registering with said vent duct, said measuring cylinder having a wall closing its forward end and being arcuated at one end to the body portion of the cylinder at that side to which the vent opening is formed, an impeller journaled in said housing for rotation in the rear end portion of the measuring cylinder, and means for imparting rotation to the impeller.

HARRY MESSNER AUSTIN.